Sept. 9, 1969  J. J. PARK  3,465,567

METHOD OF MAKING TUBES

Filed Dec. 30, 1966

INVENTOR
John J. Park

ATTORNEYS

United States Patent Office 3,465,567
Patented Sept. 9, 1969

3,465,567
METHOD OF MAKING TUBES
John J. Park, Springfield, Va., assignor to the United States of America as represented by the Administrator of the National Aeronautics and Space Administration
Filed Dec. 30, 1966, Ser. No. 606,464
Int. Cl. B21d *31/00;* B21c *17/06;* C21d *7/14*
U.S. Cl. 72—364                                            4 Claims

ABSTRACT OF THE DISCLOSURE

One end of a relatively long thin flat strip of metal is formed into a substantially circular cross section about its long axis. The circular end is then inserted through a glass forming tube so that the metal strip is restrained in the shape of the forming tube. The thusly restrained strip is heated at a sufficient temperature and for an adequate time so that the strip retains a tubular shape about its long axis when unrestrained by the forming tube.

---

The invention described herein was made by an employee of the United States Government and may be manufactured and used by or for the Government for governmental purposes without the payment of any royalties thereon or therefor.

This invention relates to a method of treating flat metallic sheets or strips so that they will repeatedly and automatically form a tube when unrestrained. When thusly treated, the strip of material may be coiled about an axis parallel to its short dimension, but it immediately forms a tube about its long axis when the roll is released. The length of the tube that is formed is controlled by varying the amount of rolled material that is released. In this manner, the length of the tube is dependent only upon the total length of the material available.

Although the above described type of tube has been previously available, it has heretofore been manufactured by relatively complicated mechanical processes, which, in many instances, have been limited in that they have been more suitable for making shorter lengths of tube. It is an object of this invention, therefore, to provide a new and improved method for making such a tube.

Tubes of the type with which this invention is concerned have found particular utility in communication devices where they have been used as antennas, for example. In this respect see U.S. Patents 3,144,104 and 3,144,215. More specifically, these tubes find great utility in connection with space satellites. In this respect, it is frequently desirable for a satellite's antennas to be as long as 150 feet. Indeed, it is contemplated that some of the more sophisticated future satellites have coiled tube antennas of this type that extend for as much as 1500 and more feet. It is therefore another object of this invention to provide a method of making coiled tube devices that may be used as communications antennas, gravity gradient booms, or the like in connection with space satellites.

In accordance with the principle of the invention a relatively long thin flat strip of metal is passed through a furnace while being formed into a tubular shape about its long axis and restrained in that manner by a forming tube having an inner diameter substantially corresponding to the desired outer diameter of the tube to be formed. After being thusly restrained for a suitable time, when removed from the furnace the formerly flat strip is in the form of a long tube. If the tube is then opened up and coiled about the short axis of the strip material it may be retained in that manner until such time as it is desired to form the tubular antenna. At that time a tube is automatically reformed merely by releasing the strip material from its storage position.

It should be noted that the length of the resulting tube is substantially identical with that of the forming material. If a long relatively continuous tube is desired, however, the method of the invention may also be employed by passing the metallic sheet through a forming tube in a furnace while the metallic sheet is moved at a controlled speed so that it has been within the furnace for a predetermined period of time.

It is sometimes desirable to vary the diameter of the tube that is formed by the process of the invention. For example, as will be noted in connection with a preferred embodiment of the invention, a long two inch wide strip of sheet material might be formed into a long tube having a diameter of perhaps as small as one-half inch. In other instances, however, it might be desirable for the resulting structure to be merely curved so as to have approximately a three inch diameter. In this case, therefore, the resulting structure would be merely arcuate or trough shaped and not a tube in the conventional sense of the word at all. It is another object of this invention, therefore, to provide a method for making an arcuately shaped boom out of a relatively long thin flat strip of material. In accordance with this aspect of the invention the degree of curvature of the boom material is controlled by altering the temperature and time during which the restrained tube is heated. In this respect, however, it should be noted that if relatively high temperatures are used the tube rapidly conforms to the inner diameter of the forming tube.

The foregoing and other objects, features and advantages of this invention will be apparent from the following more particular description of preferred embodiments thereof as illustrated in the accompanying drawings wherein the same reference numerals refer to the same parts throughout the various views. The drawings are not necessarily intended to be to scale, but rather are presented so as to illustrate the principles of the invention in clear form.

Figure 1:
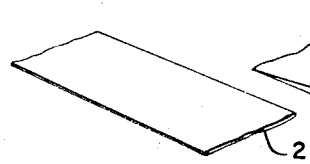
FIG. 1 is a perspective view of a portion of a strip of material upon which the method of the invention is practiced.
Figures 2, 3:
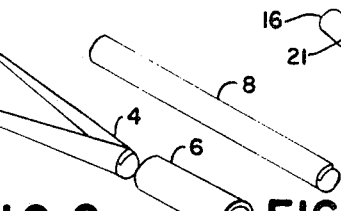
FIG. 2 is a perspective view of the FIG. 1 strip material having one of its ends formed into a tubular shape and inserted into a forming tube prior to being placed into a furnace.
FIG. 3 is a perspective view of a tube which results from the method of the invention.

A preferred embodiment of the invention's method will now be described in connection with FIGS. 1 through 3 where a long thin strip of metal 2 comprises the forming material which is to be made into the automatically formable tube structure. In this respect, the invention's method is applicable to any one of a host of alloys, but for simplicity it will only be described in connection with one of the beryllium copper alloys. Specifically, the alloys to be described in the subsequent examples had ranges of up to 2.0% beryllium and as little as 0.20% of cobalt and/or nickel. Hence, in FIG. 2 an ASTM alloy B190 which is several feet long by two inches wide and 0.002 inch thick, has one end thereof overlapped into a conico-cylindrical shape as illustrated at numeral 4 of FIG. 2. That end of the alloy strip is then inserted into a glass tube 6 having an inner diameter of 0.65 inch. The copper alloy strip is then further inserted into the tube so that the strip forms a cylinder inside of the forming tube 6 similar to that illustrated in FIG. 3 which also represents a final product as will now be further described.

The forming tube and the restrained alloy strip are placed into a preheated oven. Assuming for the moment that it is desired to have a resulting product whose outer diameter substantially conforms to the inner diameter of the forming tube, the temperature of the oven in the particular embodiment should be in excess of about 700° F. The copper strip is soon brought up to the oven's temperature, and after a total of about 15 minutes have elapsed the product is removed from the furnace; cooled; and the forming tube removed. The resulting product is substantially as illustrated in FIG. 3.

It should be appreciated that a conforming tube can also be obtained at temperatures above 700°. In fact, as will be described more fully in connection with FIG. 6, conforming copper alloy tubes have been obtained at temperatures of over 900° F., in which event the time should be reduced to about 4 minutes. In this respect, it should also be noted that times in excess of 15 minutes can also be used. This, however, would cause a slow-down in production and probably would not be desirable in most cases.

Figure 4:
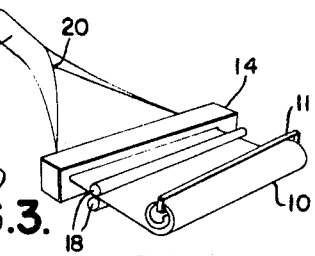
FIG. 4 is a perspective view of a tube made in accordance with the invention as it might be housed in the satellite of FIG. 5 and illustrates the manner in which the tube is stored within the satellite and fed therefrom when it is extended for use.
Figure 5:
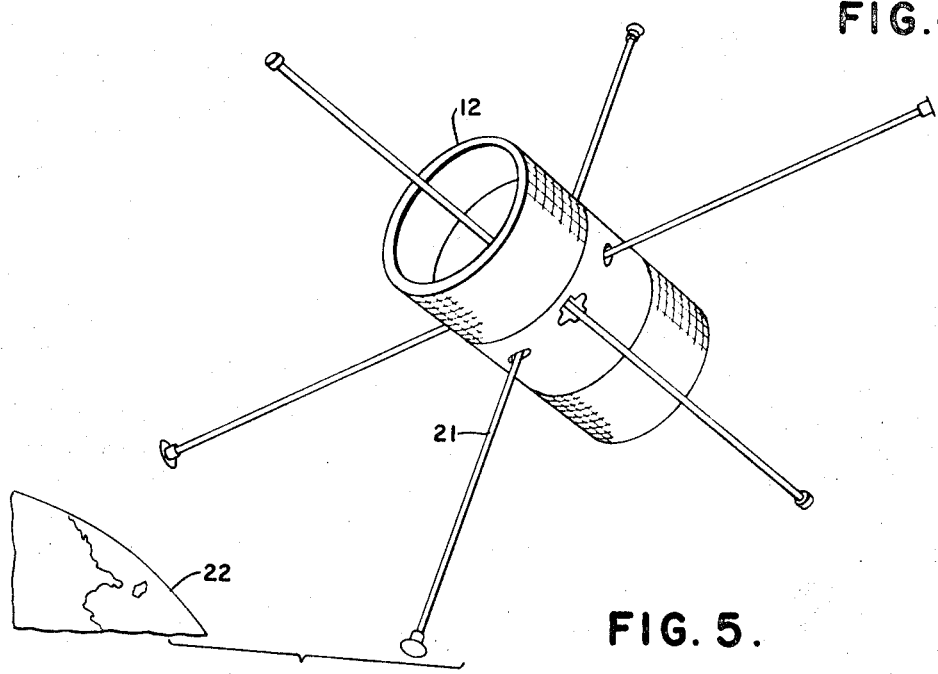
FIG. 5 is a perspective view of a satellite with which a tube or boom that is made in accordance with the invention finds particular utility.

After having been formed as described above the tube may then be uncurled from its tubular form and recoiled about its short dimension (the two inch width) as illustrated at 10 in FIG. 4. This coiled form is retained by any convenient means such as clip 11. In this manner, the entire length of the alloy strip may be stored in a satisfactorily compact manner so as to make it suitable for use in space satellites, for example. In this latter respect a plurality of coil tube structures are suitably housed within a satellite 12 as shown in FIG. 5.

By way of example, one suitable type of housing employs a slotted bracket 14 through which one end 16 of the alloy strip is permitted to pass. The coiled portion 10 of the strip is retained by the clip 11 in a suitable container which, for purposes of illustration, has been removed. The coil strip is thereby confined but is left free to unroll as it is driven out of the slotted bracket 14 by means of a pair of feed rollers 18. Shortly after the end of the strip passes out of the slotted bracket 14 it begins to automatically reform into a tube at about point 20 in FIG. 4 which is about 5 or 6 inches from the bracket 14. From that point on the strip forms an open ended tube 21. This is illustrated in both FIG. 4 and FIG. 5 where the tube extends out of the satellite 12 to function as an antenna or boom so as to assist in communications with the earth 22 below. In this respect, antennas as long as 150 feet have been produced and antennas as long as 1500 feet and longer are contemplated.

When it is desired to withdraw the antenna tube into its associated satellite, which incidentally, may be a manned vehicle, a suitable driving structure such as the driving rolls 18 pulls the strip material back into its housing where it is recoiled in a fashion illustrated at 10 in FIG. 4 and once again retained by the clip 11. It should be noted that a device made in accordance with the method of the invention is not only capable of automatically rapidly forming an antenna boom of any desired length, but the antenna can be withdrawn and extended repeatedly without evidence of fatigue, failure to form its desired tubular shape upon extension, or other types of malfunction. When tubular booms are formed by work hardening processes on the other hand, they have a tendency toward relative brittleness.

The time that the metal strip is retained in the oven may be varied depending upon the temperature of the oven. This variation takes on quite some significance when it is desired to fabricate long lengths of tubing. That is, although the above method was described in terms of placing the entire metal strip in a furnace, the method is not limited thereto. For example, a satisfactory result is also obtained by continuously drawing the metal strip through the forming tube 6 which is located within the oven. When this method is used the strip material is suitably supported outside of the oven. Its one end is then fed into the oven and through the forming tube 6 by any suitable means after which it is withdrawn from the oven by similarly suitable means and formed into a coil about its short axis as is illustrated at 10 in FIG. 4.

Figure 6:
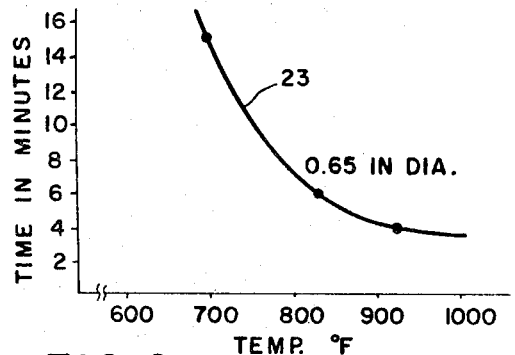
FIG. 6 is a graph illustrating the times and temperatures that are used in connection with an example of the process of the invention.

FIG. 6 is a graph illustrating the lengths of time and temperatures at which various test structures were retained in the furnace in order for the resulting tubular structure to have an outer diameter of substantially the same dimension as the inner diameter of the forming tube.

A 0.65 inch diameter forming tube was used for the tests in which the FIG. 6 data were obtained. As can be seen from that figure, a conforming diameter—that is, a final tube diameter that is substantially the same as that of the glass forming tube's—can be obtained at a variety of temperatures depending upon the time that the strip material is retained in the furnace. For example, if the furnace temperature is raised to 920° F. a conforming copper alloy tube can be obtained after only four minutes. Similarly, only six minutes are required for an 830° F. furnace temperature. Except for practical production reasons there is no apparent upper limit on the time that a given metal strip can be heated. In other words, the forming tube diameter is a lower limit for the diameter of the resulting tube and longer time periods are not operative to reduce it.

If it is desired to produce a tube by the continuous process just noted the data from FIG. 6 may be used to determine the length of time which each portion of the thusly formed tube must be retained within the furnace. Hence, depending upon the length and temperature of the furnace, the feeding speed of the input strip material is easily determined. In this respect, although a copper alloy has been illustrated it will be appreciated that the method of the invention applies to other metals as well. For purposes of simplicity, however, the instant description is limited to the above simple example.

When it is desired to apply the concepts of the invention to other metals it is merely necessary to first determine the lengths of time at which a strip material must be maintained within its forming tube at various temperatures in order to produce a resulting tube having a diameter that corresponds to that of the forming tube. After the various time and temperature relationships are determined in the manner noted above, it is merely necessary to integrate the time-temperature quantity under the curve corresponding to 23 in FIG. 6. Insofar as the example is concerned, a mechanical integration process revealed that 320 degree-minutes are sufficient for obtaining a tube having a diameter substantially the same as that of the glass forming tube 6. Hence, for the specific example given, the flat sheet strip should be moved through the furnace at a speed which, when considered in connection with the temperature of the furnace, results in the strips being exposed to something in excess of about 320 degree-minutes. It should be carefully noted with respect to this example, however, that the integrated degree-minute figure is different for each metal that is thusly formed and moreover contains various variable factors depending upon the type of mechanical integrating equipment used and the size of the plot. The principle of the method, however, should be apparent to those skilled in the art. That is, a determination is made of a practical minimum amount of time and temperature at which a specific type of metallic strip must be retained in order for it to have a resulting tubular diameter substantially the same as that of its forming tube. This information is then used to determine the speed with which the specific metallic strip is drawn through a furnace of a given temperature.

Figure 8:
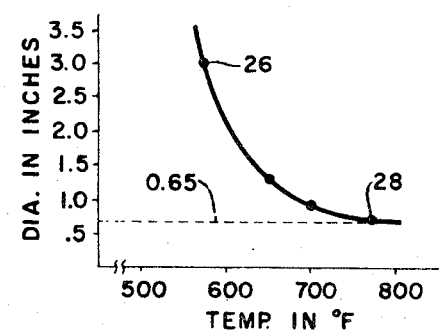
FIG. 8 is another graph which is used in connection with the description of the aspect of the invention relating to FIG. 7.
Figure 7:
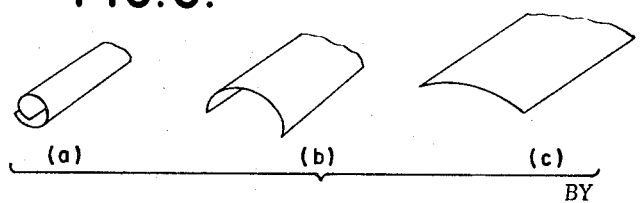
FIG. 7 is a perspective view of portions of several booms which, in accordance with another aspect of the invention, are formed into tubes or troughs of various diameters.

In many instances it is desired that the resulting structure have merely an arcuate or trough shaped cross-section. In FIG. 7 for example, (a) represents the cross section of the structure just described; (b) on the other hand, illustrates a structure having an intermediate trough shaped cross-section; and (c) illustrates a structure having an even larger curvature. Structures of this type having any selected curvature may be obtained by varying the temperature and time during which the metallic strip is retained by its forming tube in the oven. For example, as illustrated in FIG. 8, although a 0.65 inch diameter glass forming tube is used; and although all of the specimens were retained within the furnace for 15 minutes; antenna booms of various curvatures were obtained depending upon the temperature of the oven. Moreover, these diameters are relatively predictable as shown by the relatively smooth curve obtained. In the case of the illustrated example, the largest illustrated diameter of 3.12 inches (point 26) resulted from the strip's being retained within the furnace for 15 minutes at 576° F. As the temperature was increased above 700° F., however, the resulting structure's diameter became substantially the same as that of the forming tube. At point 28, for example, a temperature of 770° F. resulted in a tube diameter of 0.68 inch. Hence, at this point substantial conformity is reached between the forming tube and the resulting tube.

It can be seen from the above discussion therefore, that if it is desired to have a resulting structure which forms less than a closed tube this can conveniently be accomplished with quite a degree of predictability insofar as the resulting structure's diameter is concerned. As noted, this may be accomplished by merely varying the temperature of the oven during a given time period. In addition, it will be apparent to those skilled in the art that for given temperatures a variation of time produces a similar result. Similarly, if time and temperature are both varied a time-degree integration such as was described in connection with FIG. 6 can be employed so as to adequately predict the diameter of the resulting boom.

The above described methods, therefore, are suitable for producing either a closed or a relatively opened tube or boom of practically any desired length. Further, a thusly formed structure may be recoiled about its short axis so as to be conveniently stored within a housing whereby it is suitable for use with space satellites, for example. In addition, merely by feeding one end of the stored coil out of the satellite, the unrestrained end automatically forms into a tube so that it can be used as an antenna or perhaps a gravity gradient device. Moreover, an antenna of this type may be extended and retracted into the satellite an almost limitless number of times without exhibiting fatigue or other undesirable characteristics.

While the invention has been particularly shown and described with reference to preferred embodiments thereof, it will be understood by those skilled in the art that various changes in form and details may be made therein without departing from the spirit and scope of the invention. For example, although a preferred embodiment of the invention has been described in connection with the use of a glass forming tube, it should be understood that any suitable material can be used for the forming tube so long as it does not react with the strip of material to be formed.

I claim:
1. A method of forming a tube from a relatively long thin strip of copper alloy comprising the steps of:
   curling one end of said strip into a substantially cylindrical shape having an axis substantially parallel to the length of the strip;
   inserting said one end through a forming tube having a predetermined inner diameter to retain said strip in a long cylindrical shape;
   heating the thusly retained cylinder at a predetermined temperature over 700° F. for a known time over 4 minutes in a furnace and removing said cylinder from said heat;
   the time and temperature of said heating step being such that after said strip is cooled it retains a predictable diameter of substantially the same dimension as the inner diameter of the forming tube without being restrained by said forming tube.
2. The method of claim 1 including the steps of removing said forming tube:
   uncurling the thusly formed strip material;
   coiling the uncurled strip about an axis substantially parallel to its short dimension;
   retaining said strip material in said coil; and
   uncoiling the outer end of the coiled strip material whereby the uncoiled portion forms an arcuately shaped structure having an axis substantially parallel to the length of the strip.
3. A method of forming a tube from a relatively long thin strip of metal comprising the steps of:
   (a) curling one end of said strip into a substantially cylindrical shape having an axis substantially parallel to the length of the strip;
   (b) inserting said one end through a forming tube having a predetermined inner diameter to retain said strip in a long cylindrical shape;
   (c) heating the thusly retained cylinder at a predetermined temperature for a known time in a furnace and removing said cylinder from said heat, the time and temperature being such that the strip retains a substantially closed cylindrical shape about its long axis and has an outer diameter of substantially the same diameter as the inner diameter of said forming tube without being restrained by said forming tube;
   (d) removing said forming tube;
   (e) uncurling the thusly formed strip;
   (f) coiling the uncoiled strip about an axis substantially parallel to its short dimension;
   (g) retaining said strip in said coil; and
   (h) uncoiling the outer end of the coiled strip whereby the uncoiled portion forms an accurately shaped structure having an axis substantially parallel to the length of the strip.
4. The method of claim 3 wherein the metallic strip is a copper alloy; the temperature is from over 700° F. to 920° F.; and the time is from a minimum of 4 minutes to 15 minutes, respectively.

References Cited

UNITED STATES PATENTS

| | | | |
|---|---|---|---|
| 1,465,755 | 8/1923 | Bundy | 72—176 |
| 2,998,047 | 8/1961 | Mally et al. | 72—368 |
| 3,177,987 | 4/1965 | Swaim | 343—877 |
| 3,331,075 | 7/1967 | Moulton | 343—877 |

CHARLES W. LANHAM, Primary Examiner

LOWELL A. LARSON, Assistant Examiner

U.S. Cl. X.R.

72—368; 148—11.5; 343—877